Figure 1:
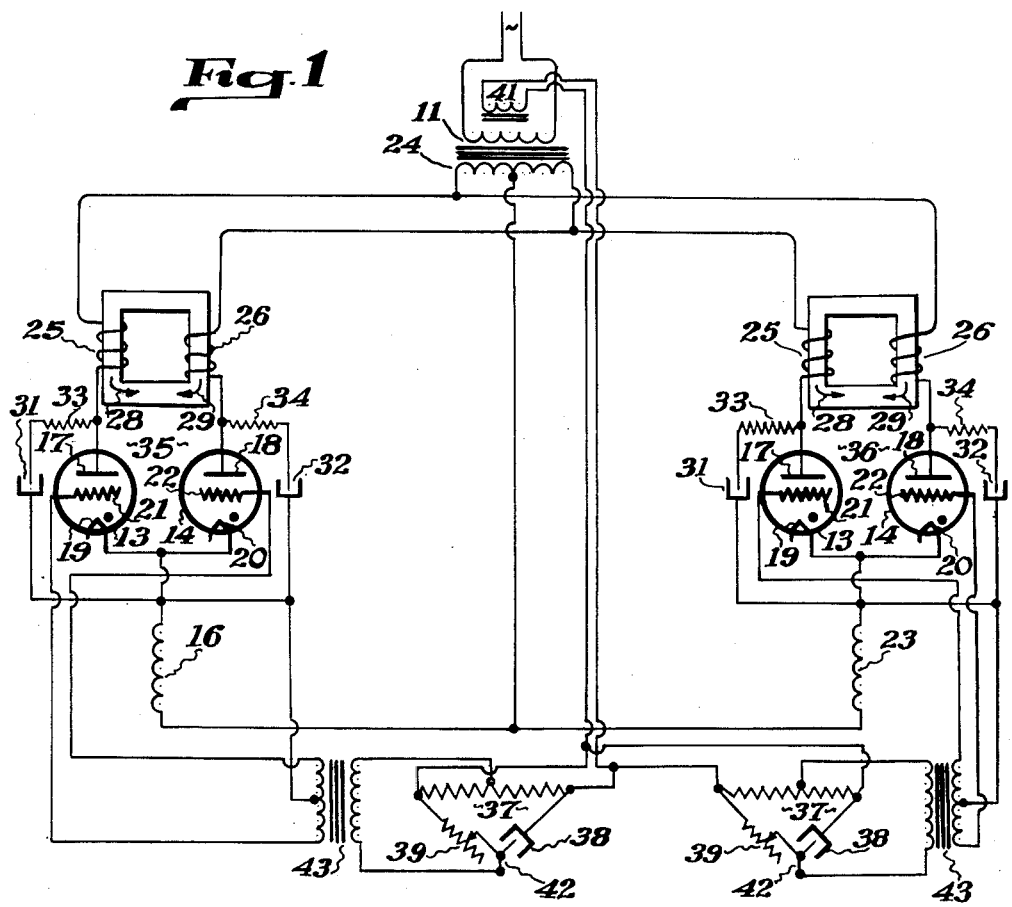

Dec. 9, 1952  W. FEW ET AL  2,621,318
CUSHIONED ELECTRONIC CONTROL WITH OPPOSED WINDING REACTOR
Filed Oct. 11, 1949  2 SHEETS—SHEET 1

INVENTORS.
WILLIAM FEW & JOHN D. SAUTER.
BY Frederic B. Schramm
ATTORNEY.

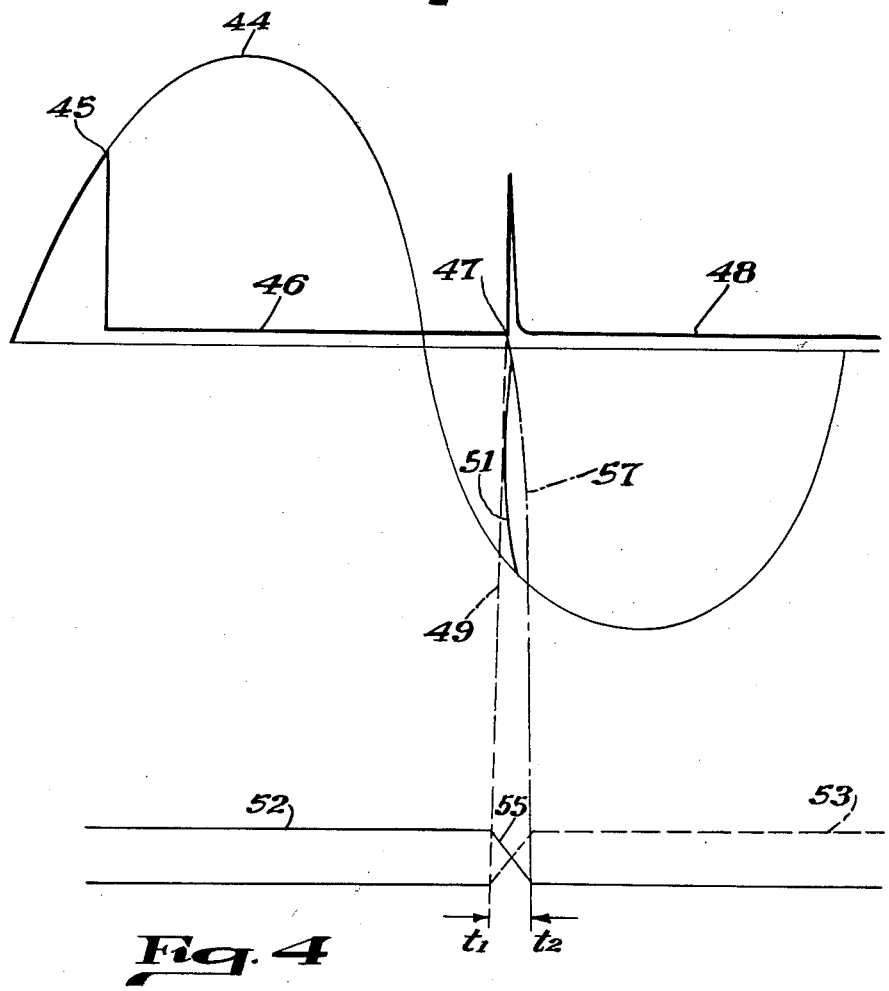

Patented Dec. 9, 1952

UNITED STATES PATENT OFFICE 2,621,318

CUSHIONED ELECTRONIC CONTROL WITH OPPOSED WINDING REACTOR

William Few and John D. Sauter, Cleveland Heights, Ohio, assignors to The Clark Controller Company, Cleveland, Ohio, a corporation of Ohio Application October 11, 1949, Serial No. 120,686

8 Claims. (Cl. 321—27)

My invention relates to current control by means of gaseous or vapor conduction rectifier tubes and concerns particularly control of currents flowing in inductive loads by control of phase of voltage applied to control grids of such tubes.

An object of the invention is to avoid excessive strain on rectifier tubes, especially those having characteristics of Xenon-filled tubes, when current is controlled in inductive circuits by initiating the conductive part of the current cycle of the tube during a high-voltage portion of the anode voltage cycle.

When using a gaseous type of rectifier tube for not only supplying direct current to a load from an alternating current source but also controlling the magnitude of the direct current, the time duration of conductivity of each of the tubes may be varied to control the magnitude of the direct current in the inductive load circuit. This, however, necessitates initiating conductivity in the rectifier tube at a time when the anode voltage is relatively large under certain conditions of operation and necessitates transferring current abruptly from one tube to the other. When the load circuit is inductive in nature, the tube from which current is being transferred may be subjected to an inverse voltage of relatively great magnitude and rate of increase. In certain types of rectifier tubes, such as Xenon-filled rectifier tubes, for example, a high rate of change of inverse voltage tends to subject the tube to deleterious action reducing their useful life. If the inverse voltage increase rate is excessive, gas "clean-up" appears to take place, causing the arc-drop voltage of the tube to become progressively greater until the tube no longer functions in the circuit for what it is intended. This effect may be overcome by lengthening the time duration of the interval during which current is transferred from one tube to the other.

It is, accordingly, an object of the invention to cause the transfer time to be sufficiently great to avoid adverse effect on the life of the tubes.

Another object of the invention is to limit rate of change of inverse voltage of one rectifier tube in a pair of bi-phase connected tubes immediately after the current conduction portion of the cycle of the other tube of the pair.

A further object of the invention is to cushion inverse voltage effects in grid controlled rectifiers with inductive load without any need for supplying or stocking special transformers. A further object is to avoid the use of transformers with leakage reactance as well as to avoid need for expensive or large choke coils or reactors. Likewise, it is an object to avoid saturation of choke coils.

Still another object is to permit connecting two or more independent, separate control circuits to a common plate transformer, while retaining full benefits of inverse-voltage cushioning in all the control circuits.

Another object of the invention is to prolong the life of rectifier tubes by avoiding detrimental action in the tube and "cleanup" of the gas within the tube.

An additional object of the invention is to avoid excessive energy loss or current dissipation by cushioning circuits.

Other and further objects, features and advantages of the invention will become apparent as the description proceeds.

In carrying out the invention in accordance with a preferred form thereof, one or more separate and independent current control circuits may be supplied by a common alternating current source or a common output winding of a power supply or plate transformer. Each of the current-control circuits includes a bi-phase rectifier tube or a pair of grid controlled gaseous discharge tubes connected bi-phase with the cathodes serving as one terminal of the load and a center tap of the supply transformer serving as the other terminal of the load. A double winding reactor is provided having each winding interposed in one of the anode leads for delaying the transfer of current from one tube to the other and capacitative cushioning circuits are connected across the tubes for cooperation with the inductance of the plate reactor to diminish rate of rise of inverse voltage.

Figure 2:
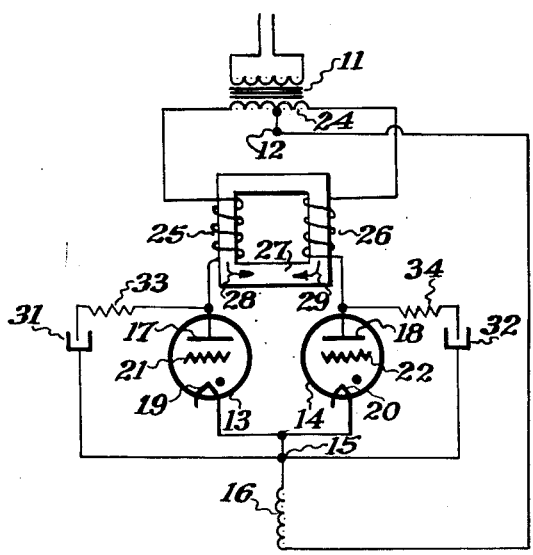

A better understanding of the invention will be afforded by the following detailed description considered in conjunction with the accompanying drawings, in which Fig. 1 is a circuit diagram of a multiple-load current-control system wherein each load is controlled independently of the circuit loads without interaction or effects of one control circuit on the other, Fig. 2 is a circuit diagram of the arrangement where only one load is required to be controlled, Fig. 3 is a graph illustrating the voltages acting in the rectifier circuits, and, Fig. 4 is a graph illustrating rectifier current, and commutation time.

Like reference characters are utilized throughout the drawing to designate like parts.

As in conventional bi-phase rectifier circuits, a power supply or plate transformer 11 is provided having a center tap 12 which may serve as one terminal of a direct current load; and a pair of rectifier tubes 13 and 14 are provided having a common cathode terminal 15 which may serve as the other terminal to which an inductive load 16 may be connected. It will be understood, that the direct current load 16 need not necessarily be inductive but the circuit is so arranged in accordance with the invention that no deleterious effects are obtained even when the load is inductive.

The rectifier tubes 13 and 14 are of the type known as thyratrons, which are of the gaseous conduction or ionic discharge type and may be filled with gas or vapor according to the current output and type of tube that is desired. The phrase "gaseous conduction type tube" will be employed in the description and claims to designate any of such tubes in which raising the potential of the control electrode initiates flow of current but current may continue to flow independently of the potential of the control electrode so long as the anode potential is sufficiently high.

The tubes 13 and 14, as illustrated, are provided with anodes 17 and 18, cathodes 19 and 20 and control electrodes or grids 21 and 22, respectively. The anodes 17 and 18 are connected to the respective ends of the secondary winding 24 of the supply transformer 11 through reactance windings 25 and 26. The windings 25 and 26 have a common core 27 and are so connected that the direct current flowing through the winding 26 and the tube 14 produces a magnetic flux in the core 27 acting in opposition to the magnetic flux produced by the current through the winding 25 and the tube 13. This is illustrated by the opposing flux arrows 28 and 29. In this manner, direct current saturation is avoided and the double winding reactor 25—26 may be considerably smaller and less expensive than either of separate anode reactors connected in the two anode leads.

Cushioning condensers 31 and 32 are connected across the tubes 13 and 14, respectively. They are connected in series respectively with resistors 33 and 34, for limiting the magnitude of condenser discharge current to values which the tubes will safely withstand and limiting energy loss in the cushioning circuit which shunts the A.-C. power supply.

Preferably, the magnitude of the resistance of the resistors 33 and 34 is such in relation to the capacity of the condensers 31 and 32 and the inductance of the windings 25 and 26 as to produce critical damping of a circuit including the elements 31, 32, 34, 26, 25 and 33 together with such unavoidable leakage reactance as there may be in the winding 24. In this manner, heating, energy dissipation and any other undesirable effects of oscillatory current are also avoided.

In order to avoid the expense of purchasing and stocking special transformers, the transformer 11 is preferably one of the standard type which normally has as little leakage reactance as is practicable, since leakage reactance is not desired in transformers in the ordinary distribution system. The reactance windings 25 and 26 are so designed as to give the desired amount of reactance for sufficiently delaying the transfer of current from one discharge tube to the other each half cycle.

Furthermore, when a plurality of separate and independent current-control circuits 35 and 36, and so on, are provided as illustrated in Fig. 1 for independently controlling current in separate load circuits, 16, 23 and so on, the arrangement illustrated permits the use of a single source of alternating current with but one power supply transformer and makes unnecessary the expense of separate transformers for isolating one control circuit from the other.

In such rectifier control circuits, the magnitude of the current flow is adjusted by adjusting the phase relationship between the voltage applied to the control grids and the voltage applied to the anodes. Any desired arrangement for adjusting the phase relationship may be employed, but for the sake of illustration, phase adjustors 37 have been shown of the rheostat-condenser type, each having a condenser 38 and rheostat 39 connected in series to a source of reference potential 41, which may be a winding of the transformer 11, and having an adjustable-phase voltage taken from the junction terminal 42 of the elements 38 and 39. In the arrangement illustrated, a transformer 43 is interposed between the phase adjustor 37 and the control electrodes 21 and 22.

In order to obtain a fraction of the maximum current output of the system illustrated in Figs. 1 and 2, the application of igniting voltage to the control electrodes 21 and 22 is delayed. As illustrated in the graph of Fig. 3, for a certain setting of the phase adjustors 37 the voltage 44 of the transformer 11 applied to the anode of the tube 21 reaches a value indicated at a point 45 when the control grid voltage reaches the value at which the tube 13 fires. Thereupon, the voltage between the anode and cathode or the arc drop falls to the value represented by the substantially horizontal line 46. At a corresponding point in the positive half cycle of the voltage 47 applied to the anode of the tube 14, the tube 14 fires and its arc drop falls to the value represented by the line 48 in the graph of Fig. 3. Since the two cathodes 19 and 20 are connected together, the potential of the cathode 20 rises very nearly to that of the anode 18 whereas, the anode 17 of the tube 13 falls to the potential represented by the point 49 in the graph of Fig. 3.

Thus, the tube from which the current is being transformed is subjected to an inverse voltage which may be relatively larger when the control grids are adjusted to have a substantial phase lag with respect to the voltage applied to the anodes. When the rate of increase of inverse voltage is permitted to exceed a given value difficulty has heretofore been encountered from a phenomenon which causes the tubes to cease to function in the circuit for which they are designed. They tend to act as "hard" tubes without adequate conductivity excessive voltage drop, and failing to exhibit the characteristics of "gas" tubes with regard to continuing to conduct current after they have been fired. As the tubes under such circumstances if excessive inverse-voltage rise exhibit progressively increasing arc-drop we believe the effect of excessive inverse-voltage rise is to "clean up" the gas in the tubes. We believe this may be accounted for as follows: owing to the fact that the load current remains substantially constant when current transfer takes place, and the assumption of current flow by one tube necessitates an abrupt cessation of current flow by the other tube. The current flow which has existed, however, in tubes of the gaseous discharge type exists only by reason of the presence of the large numbers of ions traveling from the anode to the cathode. When the electrodes are subjected to inverse voltage the ions are suddenly attracted to the anode instead of being repelled from it, with a force proportional to the magnitude of the inverse voltage. When the rise in inverse voltage is very abrupt, therefore, a large number of ions seem to be driven into the anode which results in disappearance of free gas molecules in the tube.

As illustrated in Fig. 3 without any cushioning means, the inverse voltage would tend to rise abruptly along the curve 51. By providing cushioning condensers 31 and 32, however, the inverse voltage may be caused to rise less abruptly since a condenser reduces the rate of change of voltage between its plates. The inductance of the windings 25 and 26 also reduces the rate of change of current in the tubes 13 and 14 so that the transfer time is prolonged as illustrated in Fig. 4, with the discharge current of the tube 13 represented by the full line 52 and that of the tube 14 represented by the dashed line 53. During the transfer period between the time instants $t_1$ and $t_2$, the current in the tube 13 falls along relatively gradual slope 55 while the current in the tube 14 arises in along a slope 56. The rise of the inverse voltage acting in the tube 14 is made more gradual so as to follow the dashed line 57 shown in Fig. 3. It has been found that Xenon-filled discharge tubes of the C6J type, for example, as well as other Xenon-filled discharge tubes may conservatively be used with a maximum initial inverse voltage application rate of 6.6 million volts per second per ampere of conduction current measured 10 microseconds before current zero.

The circuit constants for the elements 25, 26, 31, 32, 33, and 34 may be computed by methods known to those skilled in the art for obtaining a slope of the inverse voltage curve 57 within the safe rating for the tubes used and also for producing a critically damped circuit. The selection of circuit constants may be made very conveniently by trial and error with the aid of an oscilloscope connected across the tube. With a tentative value of inductance and capacity the resistance of the resistors 33 and 34 is adjusted until just great enough to eliminate overshoot of the voltage trace on the oscilloscope screen which indicates critical damping.

The slope of the inverse voltage trace on the oscillogram is then measured. If the slope is too great, the process is repeated with greater inductance in the windings 25 and 26 or with greater capacity of the condensers 31 and 32. The greater the product of inductance and capacity, the smaller the slope of the inverse voltage curve, provided the resistance is no greater than necessary to produce a critically damped circuit.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the annexed claims.

What is claimed is:

1. In combination, a source of alternating current having a center tap, an adjustable-current rectifier circuit supplied by said alternating current source comprising in combination a double winding reactor, a pair of gaseous discharge tubes for alternately carrying current, with anodes, cathodes and control electrodes, a cathode terminal, which together with said center tap, is adapted to be connected to an inductive load, the current in which is controlled by said circuit, a condenser and a resistor connected in series across the anode and the cathode of each of said tubes, and the windings of the reactor being each in series with the alternating-current source and one of said anodes so connected so as to act in opposition with respect to the magnetic circuit of the said reactor in response to rectified current flowing through each of said tubes, the magnitude of the resistance being such in relation to the inductance and capacity of the reactor winding and the condenser, respectively, as to produce critical damping, and a phase adjustor for said control electrodes for varying phase relation between the anodes and the control electrodes of the tubes for controlling the magnitude of the direct current flowing in the load, whereby inverse voltage effects in each rectifier tube, as current is being transferred to the other tube, are cushioned without excessive energy loss.

2. In combination, a neutral terminal and a cathode terminal adapted to be connected to an inductive direct-current load, end voltage terminals, said end terminals and neutral terminal being adapted to be connected to the ends and center of a source of alternating current having a center tap, a pair of rectifier tubes of the gaseous discharge type, each having an anode, a cathode connected to said cathode terminal and a control electrode for controlling magnitude of direct current between said neutral terminal and said cathode terminal, a double winding reactor having a common magnetic circuit with one winding connecting one end voltage terminal to the anode of one of said tubes and having a second winding connecting the other end voltage terminal to the anode of the other of said tubes, said windings being so connected with respect to direct current flowing through said tubes as to act in opposition with respect to the magnetic circuit of the reactor, a pair of cushioning condensers and a pair of resistors, one condenser and one resistor being connected in series across the anode and cathode of one of said tubes and the other condenser and resistor being connected across the anode and cathode of the other of said tubes, the magnitude of the resistance with relation to the magnitude of the capacity of the condenser and the inductance of the winding of the reactor being such as to produce critical damping of an oscillatory alternating current, whereby the magnitude of the direct current in the inductive load may be varied by adjustment of the phase relation between the control electrodes and the anodes of said tubes, whereby time required for transfer of current for one tube to the other at the end of the conducting cycle of each tube is caused to be great enough to prevent excessive rise of inverse voltage between the anode and cathode of the tube from which current is being transferred and without dissipation of excessive energy in the cushioning circuit.

3. In combination, a neutral terminal and a cathode terminal adapted to be connected to an inductive direct current load, end voltage terminals, said end voltage terminals and neutral terminal being adapted to be connected to the ends and center, respectively of a source of alternating current having a center tap, a pair of rectifier tubes of the gaseous discharge type for alternately carrying current, each having an anode, a cathode connected to said cathode terminal and a control electrode for controlling magnitude of direct current between said neutral terminal and said cathode terminal, a double winding reactor having a common magnetic circuit with one winding connecting one end voltage terminal to the anode of one of the said tubes and having a second winding connecting the other end voltage terminal to the anode of the other of said tubes, said windings being so connected with respect to direct current flowing through said tubes as to act in opposition with respect to the magnetic circuit of the reactor, a pair of cushioning condensers and a pair of condenser-discharge limiting resistors, one condenser and one resistor being connected in series across the anode and cathode of one of said tubes and the other condenser and resistor being connected across the anode and cathode of the other of said tubes, whereby the magnitude of the direct current in the inductive load may be varied by adjustment of the phase relation between the control electrodes and the anodes of said tubes, whereby time required for transfer of current for one tube to the other at the end of the conducting cycle of each tube is caused to be great enough to prevent excessive rise of inverse voltage between the anode and cathode of the tube from which current is being transferred and without dissipation of excessive energy in the cushioning circuits.

4. A direct-current controller comprising in combination, a reactor having a pair of windings adapted to be connected to a source of alternating current having a neutral terminal or center tap, and a pair of gaseous type discharge tubes for alternately carrying current, each having an anode, cathode and grid, the cathodes being adapted to be connected in series with an inductive load and a center tap of an alternating-current source, and the grids being adapted to be connected to a control system for alternately activating the discharge devices, and capacitative cushioning circuits connected across the tubes for preventing excessive inverse voltage rise during transfer of current from one tube to the other.

5. A direct-current controller comprising in combination, a pair of gaseous type discharge tubes for alternately carrying current, each having an anode, a cathode and a control electrode, a reactor having a core with a pair of windings thereon, for connecting a source of alternating current to said anodes, each winding being in series with one of said anodes and acting in opposition with respect to magnetic flux produced in said core by direct current flowing through said discharge tubes, the cathodes of the discharge tubes being connected together and being adapted to be connected in series with an inductive load and a center tap of an alternating current source, and a capacitative cushioning circuit connected across the tubes for preventing excessive inverse voltage rise during the transfer of current from one tube to the other.

6. A direct-current controller comprising in combination, a neutral terminal and a cathode terminal adapted to be connected to an inductive direct-current load, end voltage terminals, said end voltage terminals and said neutral terminal being adapted to be connected to the ends and center respectively of a source of center-tapped alternating current, a pair of rectifier tubes of the gaseous discharge type for alternately carrying current, each having an anode, a cathode connected to said cathode terminal, and a control electrode for controlling magnitude of direct current between said neutral terminal and said cathode terminal, a reactor having a pair of windings, each connected between one of said end voltage terminals and one of said anodes, and capacitive cushioning circuits connected across the tubes for preventing excessive inverse voltage rise during the transfer of current from one tube to the other, each cushioning circuit comprising a condenser in series with a resistor of sufficient resistance for limiting the discharge current of the condenser to the maximum rated current of the tube.

7. In combination, a transformer having substantially as little leakage reaction as is commercially practicable, whereby the transformer is interchangeable with stock commercial transformers for ordinary alternating-current distribution circuits, said transformer having a secondary winding with a center tap, a reactor having a pair of windings, a pair of gaseous-discharge type rectifier tubes, each having an anode and a cathode with means for transferring current from one tube to the other for controlling the magnitude of direct current supplied by the tubes, a cathode terminal connected to said cathodes, for supplying an inductive direct-current load in series with the said transformer center tap and capacitative cushioning circuits each connected across one of said tubes, each of the windings of the reactor being connected between one end of said transformer secondary winding and one of said tube anodes with a connection such that the direct current flowing in said tubes acts in opposition in said reactor windings with respect to the magnetic circuit of the reactor, whereby relatively inexpensive transformers and reactors may be employed in supplying controlled direct current to inductive loads without subjecting the rectifier tubes to excessive inverse voltage rise.

8. In combination, a neutral terminal, a cathode terminal adapted to be connected to an inductive direct-current load which is to be controlled, end voltage terminals, said end voltage terminals and neutral terminal being adapted to be connected to the ends and center respectively of a source of alternating current having a center tap, an adjustable current rectifier circuit, comprising in combination a pair of rectifier tubes of the gaseous discharge type for alternately carrying current, each having an anode, a cathode, and a control electrode for controlling the magnitude of direct current between said neutral terminal and said cathode terminal, both cathodes being connected to said cathode terminal, a double-winding reactor having one winding connecting one anode of the pair of tubes to one of said end voltage terminals and the second winding connecting the anode of the other of the pair of tubes to the other end voltage terminal, and capacitive cushioning circuits, each connected across one of the tubes for preventing excessive inverse voltage rise during transfer of current from one tube to the other.

WILLIAM FEW.
JOHN D. SAUTER.

REFERENCES CITED

The following references are of record in the file of this patent:

UNITED STATES PATENTS

| Number | Name | Date |
|---|---|---|
| 921,918 | Troy | May 18, 1909 |
| 1,772,133 | Dobben | Aug. 5, 1930 |
| 1,867,419 | Peek | July 12, 1932 |
| 1,930,165 | Gage | Oct. 10, 1933 |